June 13, 1967  H. R. LAMBIE ET AL  3,324,784
POWERED EXTRACT VENTILATOR
Filed June 21, 1965  2 Sheets-Sheet 1

INVENTORS.
HOWARD RUSSELL LAMBIE.
RAYMOND ALFRED FRANK BURTENSHAW

BY RUSSELL & MOORE.

ATTORNEYS

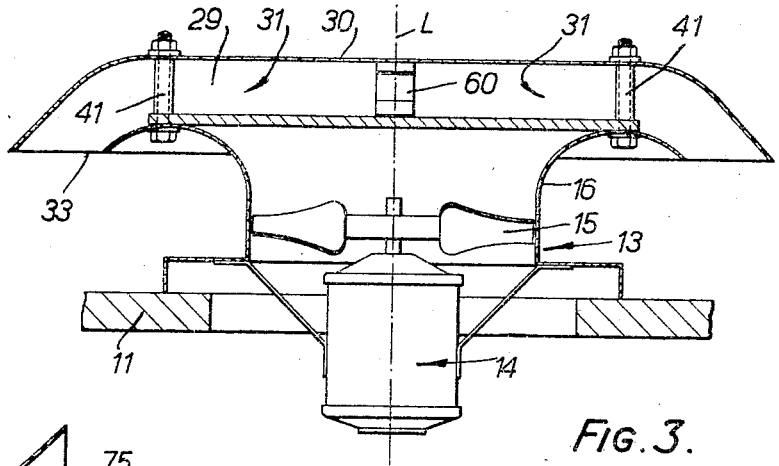
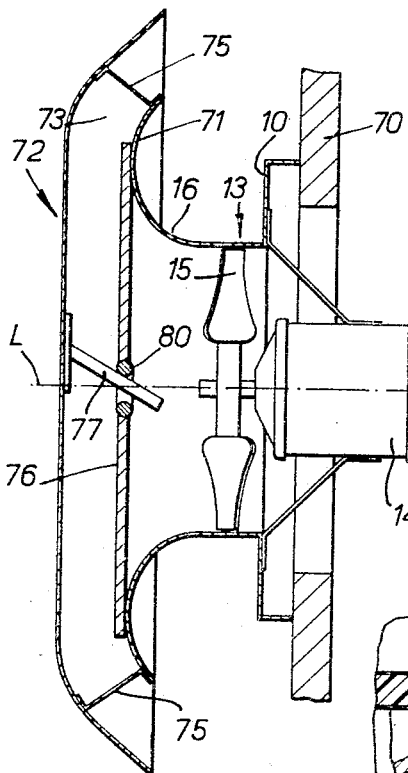
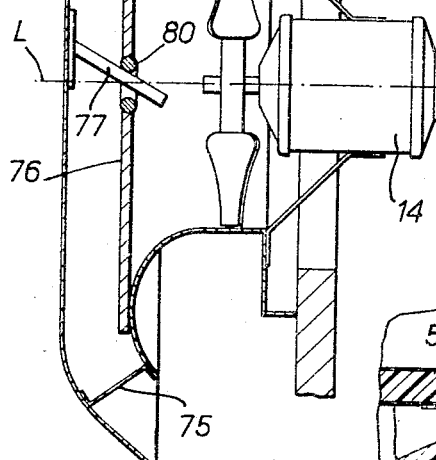
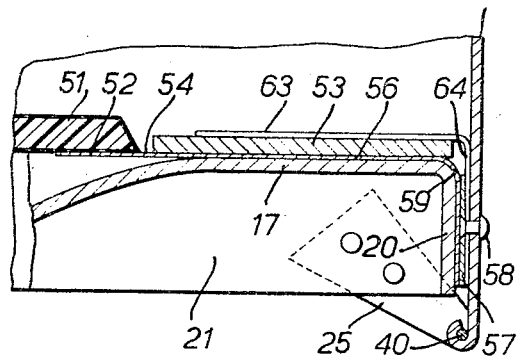

United States Patent Office 3,324,784
Patented June 13, 1967

3,324,784
POWERED EXTRACT VENTILATOR
Howard Russell Lambie, Hayling Island, and Raymond Alfred Frank Burtenshaw, Havant, England, assignors to Colt Ventilation and Heating Limited, Surbiton, England, a British company
Filed June 21, 1965, Ser. No. 465,588
Claims priority, application Great Britain, June 22, 1964, 25,810/64
11 Claims. (Cl. 98—43)

This invention relates to ventilators and is concerned with powered extract ventilators of the kind including powered means (commonly a fan) for promoting a flow of air through the ventilator and a weather hood to provide protection against weather entry through the ventilator.

Such ventilators also usually incorporate a damper means to close the ventilator when the fan is not operating so as to prevent draught through the ventilator and to conserve the heat in the building.

With such a ventilator the weather hood, and the damper means unavoidably offer a certain amount of resistance to the outflow of the air through the ventilator with a consequent reduction in the efficiency of its operation. It is of some importance to keep this reduction in efficiency as small as possible not only so that the number or size of ventilators for a particaular installation may be kept down but also so that the speed of the powered means e.g. the fan may be kept down, to keep the noise level as low as possible.

The loss of efficiency which is suffered is due to the changes in direction which the weather hood and the damper means impose upon the airstream through the ventilator.

An object of the present invention is to provide, in a powered extract ventilator, an arrangement in which efficiency losses incurred by a change of direction imposed upon the airstream for example by the weather hood are recovered thereafter to a substantial extent by the action of the constraint imposed on the airstream after the change of direction has occurred.

Another object of the invention is to change the direction of the airstream under the weather hood in the smallest possible height whilst minimizing the loss in efficiency occasioned by the change of direction imposed, whereby an efficient ventilator of low silhouette may be achieved.

A still further object of the present invention to provide damper means which is well adapted for use with an efficient low silhouette ventilator according to the invention.

In order that the present invention may be understood specific embodiments of the present invention will now be described by way of example with reference to the accompanying drawings in which:

FIG. 3 is a cross-section on line 3—3 in FIG. 2,

FIG. 4 is a scrap view showing a detail of construction and

FIG. 5 is a cross-sectional side elevation showing a modification.

Figure 1:
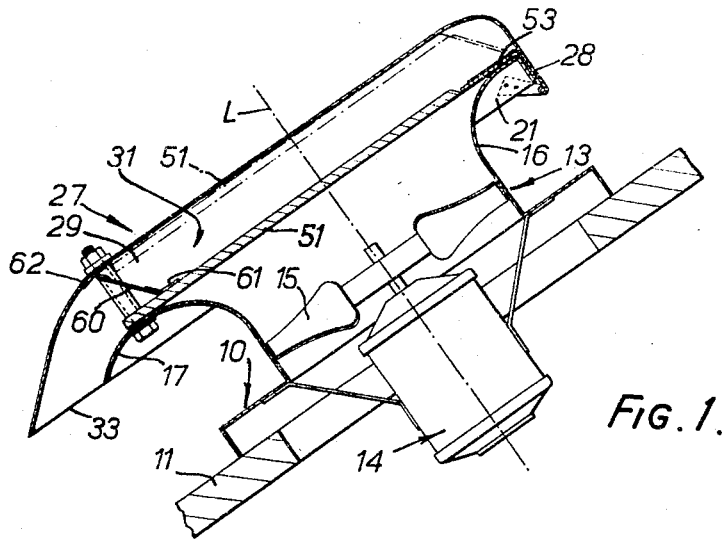
FIG. 1 is a cross-sectional side elevation of a ventilator in accordance with the present invention.
Figure 2:
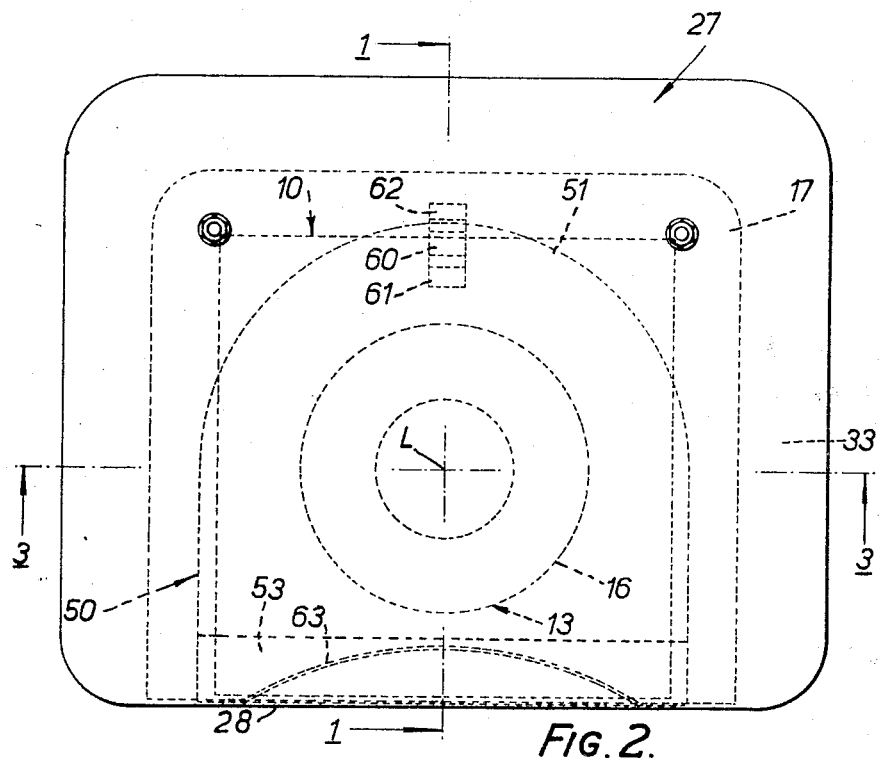
FIG. 2 is a plan view of the ventilator shown in FIG. 1.

The ventilator shown in FIGS. 1 to 4, is intended to be positioned on a sloping roof as illustrated in FIG. 1. To this end the ventilator is of asymmetrical form so as to provide adequate weathering on its side facing up the slope of the roof, as will hereinafter be explained. The ventilator comprises a base 10 which would be flashed to the roof 11. A circular sectioned passage means or duct 13 opens through the base 10 at its lower end and extends upwardly from the base to lead air from inside the roof to the outside of the roof. A fan 14 is mounted on the base 10 with the fan impeller 15 arranged to run closely within a cylindrical portion of the passage means 13 adjacent the base 10, the fan, when operating, extracting air from within the building and causing it to flow through the passage means 13 to the outside of the building. The passage means 13 has an exit portion 16, which in the present example, is downstream of the impeller and which diverges in the direction of air flow entering the exit portion. Thus the exit portion 16 is trumpet mouthed having a continuously curved, smoothly divergent wall which turns through a full right angle to blend with a radially outwardly extending peripheral flange 17 on the downstream end of the passage means 13. The flange 17 is also of continuously curving shape in cross-section in the present example so as to follow the general curve of the diverging wall of the exit portion 16. The flange 17 is also of rectangular form in plan with rounded corners, as shown in FIG. 2. On the side of the ventilator intended to face up the slope of the roof, the flange 17 is foreshortened in radial extent and is turned down sharply at right angles so as to present a straight, flat flange part 20 normal to, and facing up, the roof slope. The flange part 20 is joined at its two ends respectively with further flange parts 21 extending at right angles thereto one along each of an opposite pair of sides of the rectangle and blending with flange parts of curved configuration as just described by means of further transitional flange parts.

The flange parts 21 carry a pair of hinge brackets 25 hingeably supporting a weather hood 27. The weather hood is of inverted, shallow, dished form, having a central flat region with a downturned peripheral rim. The hood is of asymmetrical, rectangular form with rounded corners to correspond with the flange 17. Thus the hood has a rear wall 28 disposed normal to the roof slope and overlying in close relation the flange part 20 to the outside thereof. The downturned peripheral rim along the other three sides of the hood likewise generally follows the shape of the flange 17 but in well spaced relation to the flange so as to define a discharge passage hereinafter more fully described.

The central region 30 of the hood (see FIG. 3) constitutes a flat baffle which confronts the trumpet mouth of exit portion 16 of the passage means 13 in spaced relation and which presents a baffle surface which extends normal to the long axis L of the passage means 13 and accordingly, in this example, the direction of air flow entering the exit portion 16 in operation of the ventilator. The baffle surface defines with the crown of the trumpet mouth an inlet 31 to a discharge passage 29 which inlet is part cylindrical and which surrounds the long axis L of the duct means, with its cylindrical axis coincident with the axis L.

The passage 29 has an outlet opening 33 defined between the edge of the hood 30 and the edge of the flange 17. The outlet opening is best seen in FIG. 2. It is of generally U-shape, in part surrounding the long axis L of the duct means 13 and, due to the curved configuration of the flange 17 and the downturned peripheral rim of the cowl 30 it lies generally in a plane parallel to the roof slope. The outlet opening 33 lies radially outwardly of the inlet opening 31 whereby the discharge passage 29 extends radially outwardly from the inlet opening 31 to the outlet opening 33.

The air which is extracted by the fan and caused to flow through the passage means 13 from inside the roof to the outside of the roof is travelling generally towards the baffle surface presented by the central region 30 of the hood as it enters the exit portion 16 of the passage means. At this region the air will usually have a component of rotary motion about the long axis L and a component of motion towards the baffle due to the fact that the air emerges from the fan impeller with a helical swirl. The sheath of air adjacent the wall of the exit portion tends to cling to and flow along the wall so as to turn through a right angle to flow radially outwardly of the long axis L without any great loss of energy, but the main body of air impinges on the baffle and its direction of movement is abruptly changed by the baffle from one approaching the baffle to one extending radially outward along the baffle surface in all radial directions. This is because in the region where the long axis L intersects the baffle surface a high static pressure is created close to the baffle due to the sudden change of direction imposed on the air causing the air to flow out all around the axis L. The radially outwardly flowing air enters the discharge passage 29 and flows along it to its discharge end to emerge into the outside atmosphere through the outlet opening 33.

The throughflow area of the discharge passage 29 increases progressively from its inlet opening 31 to its outlet opening 33 due to the radial enlargement of the passage. Adjacent its inlet opening 31 the throughflow area of the passage 29 is made equal to the throughflow area of the cylindrical passage means 13 adjacent the base 10. The throughflow area available for the air entering the discharge passage is accordingly not less than the throughflow area available to it on entry to the exit portion 16 of the passage means, and, accordingly no restriction (i.e. contraction of the airflow path) is imposed on the air after it leaves the fan and flows through the exit portion 16 and enters the discharge passage 29 to emerge to the outside atmosphere. Due to the progressive radial enlargement of the passage 29, which confines the air between its inlet and its outlet and because of the progressively increasing throughflow area of the passage 29 between its inlet and its outlet due to the radial enlargement the air decelerates in the discharge passage and its velocity pressure ratio is greatly reduced before its final exit from the discharge passage. This reduction in velocity pressure ratio at discharge results in a syphoning action causing more air to be drawn through the fan impeller than would otherwise be achieved by the fan alone. As a consequence the rate of extraction of air is improved and the improvement which can be achieved in this way can be made to balance out a large proportion of the losses due to the abrupt change of direction which is imposed upon the airstream by the baffle i.e. the cowl.

The hood is hinged to the brackets 25 on a hinge rod 40 and is supported in upwardly spaced relation to the flange 17 by a pair of pillars 41 on the flange 17 towards its front edge. The pillars conveniently comprise spacing sleeves on bolts used to secure the hood in its closed position.

The downturned rim of the hood and of the flange 17 adequately weathers the ventilation opening through the passage means 13 to prevent the entry of wind blown rain. The "up slope" side of the ventilation opening is completely closed off and sheltered by the wall portion 28 of the hood which prevents water being blown up under the hood by wind blowing in the direction directly down the roof slope.

A ventilator as just described may have a symmetrical form if it is to be used on a flat roof for example. In this case the ventilator would have a cross-sectional shape corresponding with FIG. 2, as shown in FIG. 3. A ventilator of the last described form may be disposed on a vertical wall and is hereinafter described in such disposition with reference to FIG. 5.

In the symmetrical form the hood and the flange 17 may be circular in plan if desired.

Referring again to FIGS. 1 to 4, the ventilator thereshown has damper means generally indicated at 50. The damper proper is constituted by a plate 51 which in the fully open position, lies flat against the underside of the hood as indicated in chain dotted lines in FIG. 1. In this position the plate blends with and forms part of the baffle and accordingly offers no additional resistance to the outflow of air through the ventilator.

In its closed position, as indicated in full lines in FIG. 1, the plate 51 seats on the crown of the trumpet mouthing so as to block the mouth of the exit portion 16 of the passage means 13 and thereby prevent downdraught through the ventilator when the fan is not operating and also conserve the heat in the building.

It is intended that when the fan is started, the plate 51 float up on the airstream and be held thereby pressed against the underside of the hood. To this end the plate is of light-weight construction and preferably composed of a sheet of polystyrene foam covered with a film of polyvinyl fluoride. The plate is hinged by a plastics film hinge 52 (see FIG. 4) to link means in the form of a rigid sheet material strip 53 (for example 26 s.w.g. aluminum sheet) along a hinge line 54 parallel to the rear edge of the flange 17, the strip 53, in the closed position of the plate 51, lying flat on the flange 17 along its rear edge, the flange acting as a stop. The strip 53 is in turn hinged by a film hinge 56 along a hinge line 59 parallel to the hinge line 54 to a further rigid sheet material strip 57 rivetted as at 58 to the inside of the rear wall 28 of the cowl 27 so as to lie between the wall 28 and the flange part 20 wehn the hood is in its closed position. Towards its front edge and midway between the side edges of the hood the plate 51 is hinged to an inclined sheet form, rigid material strut 60 by a film hinge 61, the upper end of the strut being connected by a film hinge 62 to the under surface of the hood. The strut 60 lies in a plane normal to the hinge lines 54, 59 and the strut and the strip 53 guide the plate 51 for up and down movement between its closed and open positions whilst maintaining the plate substantially parallel with the plane of the mouth of the exit portion 16 and the central region of the hood.

A bowed piano wire spring 63 has its two ends 64 bent at right angles to the bow and clamped to the rear wall 28 of the hood under the strip 57, the spring bow lying flat on the strip 53 and urging the strip flat against the flange 17. In this position the plate 51 is straight in line with the strip 53, and the plate and the strip are prevented from pivoting together about the hinge line 59, by the strut 60. The plate is accordingly locked in its closed position by toggle action between the strip 53 and the plate.

When the fan is started, the build up of pressure under the plate "breaks" the toggle along the hinge line 54 so freeing the plate for upward floating movement.

It is to be understood that the piano wire spring only lightly biases the plate closed. Nevertheless the plate must float up against the action of the spring, the spring force on the rear edge of the plate increasing with deflection. This is compensated for by the decreasing angle of the strut 60 making a greater component of air thrust available on the front of the plate the more closely it approaches the cowl, whereby the plate remains substantially parallel to its fully open and closed positions while moving therebetween.

This is of some importance because it may be required to operate the ventilator at intermediate speeds and extraction rates at which the plate 51 does not float up against the underside of the cowl but remains balanced on the airstream at some intermediate position. In this case the plate 51 forms the baffle to define with the exit portion 16 and the flange 17 the discharge passage 29, the inlet to the discharge passage being formed between exit portion 16 and the baffle and the outlet from the discharge passage being formed between the peripheral edge of the flap 51 and the flange 17.

This means of course that the throughflow area of the inlet to the discharge passage is variable depending on the fan speed. Accordingly a compromise solution would be chosen in which in the fully open position of the plate 51 the throughflow area of the inlet 31 to the discharge passage 29 exceeds the throughflow area at the entry to the exit portion 16 whilst at the lowest fan speed the plate 51 takes up an intermediate position in which the throughflow area of the inlet to the discharge passage is equal to or not substantially less than the throughflow area at the entry to the exit portion. In the latter connection it is noted that in the illustrated embodiment now being described, the motor 14 blocks the passage means 13 to some extent upstream of the entry to the exit portion. Because of this it is possible to reduce the throughflow area of the inlet to the discharge passage to some extent below that of the entry to the exit portion 16 without restricting the air flow by an amount greater than the restriction which it suffers on entry to the passage means 13.

In FIG. 5 a further form of ventilator is shown positioned on a vertical wall 70 of a building. The construction is the same as previously described except that the flange 71, corresponding with the flange 17 previously described, and the weather hood 72 corresponding with the weather hood 30 previously described are of symmetrical circular form in plan, the discharge passage 73 being a fully circular passage completely surrounding the long axis L. The cowl 72 is supported from the flange 71 by brackets 75.

The damper plate is formed by a disc 76 guided on an inclined rod 77 carried from the inner surface of the hood and up and down which the disc can slide between its closed position (as illustrated) and its fully open position in which it is applied by the airstream flat against the inside of the hood. When the fan is stopped the disc 76 slides down the rod 77 and applies itself against the flange crown of the trumpet mouthing to prevent draught and conserve the heat in the building.

The rod 77 is preferably nylon covered and slides in a ring 80 of self-lubricating or low friction material. The ring 80 has a large clearance on the rod 77 to prevent all possibility of clogging or sticking.

The ventilator as described with reference to FIG. 5 is suitable for use horizontally and vertically and also in intermediate positions between horizontal and vertical provided that it is orientated so that the disc 76 can slide down the rod to take up its closed position.

Ventilators as described are particularly suitable for manufacture in small sizes or to run at low fan speeds since the damper means may be of extremely light-weight construction capable of being opened by a slow moving airstream. However, large capacity ventilators are equally possible.

It will be appreciated that it is not essential to use the weather hood to form the baffle. The baffle could be constituted always by the damper plate or disc for example or again by a sheet form baffle element inside a separate cowl of any known or convenient construction. However in the interests of achieving a low profile it is clearly of benefit to use the cowl itself to form the baffle.

The non-return shutter arrangements described are particularly adapted for use in a ventilator employing a baffle and a discharge passage in which losses are recovered as hereinbefore described. However, it will be appreciated that advantages accrue from the damping arrangements per se and the present invention includes such arrangements adapted for use in conventional powered extract ventilators in place of conventional dampers without necessarily defining in their open position an inlet to any discharge passage in which losses are recovered.

In the embodiments described it is not essential that the fan impeller be positioned to run in the cylindrical portion of the passage means 13. The fan impeller may be located in the exit portion 16.

The passage means 13 may have any desired extent. It might for instance extend a considerable distance into the building. Nor is it necessary that the long axis of the passage means be straight throughout.

Some form of catch means (not shown) may be provided to lock the disc 76 in its closed position. Such catch means may be released by the swirling movement of the air beneath the disc when the fan is started up. For example a catch release means in the form of a flap hinged on the wall of the passage means beneath the disc 76 could be angularly adjusted by the swirling air to release the catch, the catch flap lying edge-on in the airstream discharging throughout the ventilator so as to offer little resistance when the disc 76 has been opened.

Using the principles described, it has been found possible to construct a powered discharge ventilator having a cowl and non-return shutter arrangement which gives a rate of extraction approaching 94% of the rate achieved without the cowl or non-return shutter arrangement on the ventilator.

We claim:

1. A powered extract ventilator adapted for mounting on a building structure including powered fan impeller means for promoting a flow of air, passage means through which extracted air is caused to flow by said impeller means during operation of the ventilator, said impeller means being located in said passage means and said passage means having an exit portion presenting a mouth through which extracted air is impelled by said impeller means, a weather hood covering over and weathering the mouth of said passage means, the outer bounding wall of said exit portion diverging towards said mouth, said wall changing direction between the inlet to the exit portion, and the mouth, generally through a full right angle, said mouth being confronted in spaced relation by air guiding means presenting a guiding surface disposed entirely to one side of the plane of the mouth for guiding the airstream detaching itself from the outer, bounding wall of the exit portion and being discharged through said mouth by the impeller means, into a direction generally radially outwardly of the mouth, discharge passage bounding means forming a smooth continuation of the outer bounding wall of the exit portion, said discharge passage bounding means confronting a wall surface and defining therewith a smooth walled discharge passage for the extracted air which discharge passage is of significant extent and which extends at least initially, generally radially outwardly of said mouth, the discharge passage having an inlet in communication solely with said passage means, through said mouth, and an outlet for the discharge of the extracted air to the outside atmosphere, the discharge passage confining the extracted air between its inlet and its outlet and having a through flow area which progressively increases from its inlet to its outlet.

2. A ventilator as claimed in claim 1 wherein said guiding surface is substantially flat and disposed normal to the direction of the airstream detaching itself from the outer bounding wall of the exit portion and emerging through said mouth.

3. A ventilator as claimed in claim 2 wherein said weather hood constitutes said guiding means, said guiding surface being formed by a central portion of the undersurface of the weather hood.

4. A ventilator as claimed in claim 2 wherein said guiding means is constituted by a damper plate movable to seat on said mouth and close said passage means.

5. A powered extract ventilator including powered fan impeller means for promoting a flow of air, passage means through which extracted air is caused to flow by said impeller means during operation of the ventilator said impeller means being located in said passage means and said passage means having an exit portion presenting a mouth through which extracted air is impelled by said impeller means, said exit portion being smoothly divergent and having an outer bounding wall which changes direction between the inlet to the exit portion and the mouth, generally through a full right angle, said mouth being confronted in spaced relation by a baffle presenting a substantially flat surface which extends normal to the airstream detaching air from the outer, bounding wall of the exit portion of said passage means and being discharged through said mouth by said impeller means, said exit portion being so shaped and disposed in relation to said flat surface of said baffle that in operation of the ventilator a sheath of air adjacent the outer bounding wall of the exit portion clings to and flows smoothly along said wall so as to turn through substantially a full right angle without any great loss of energy whilst the body of the air which detaches itself from the outer bounding wall of the exit portion impinges on the baffle and flows radially outward along the baffle surface in all directions, said baffle comprising a damper plate movable between a closed position in which it seats on the mouth of said passage means and a fully open position in which it lies flat against said baffle so as to blend with and form at least part of said baffle surface.

6. A ventilator as claimed in claim 5 wherein the ventilator includes a weather hood covering over and weathering the mouth of said passage means, said hood having a central substantially flat portion constituting said baffle.

7. A ventilator as claimed in claim 5 including a damper plate movable between a closed position in which it seats on the mouth of said passage means and an open position in which it constitutes said baffle.

8. A powered extract ventilator adapted to be attached to a building including powered fan impeller means for promoting a flow of air, passage means through which extracted air is caused to flow by said impeller means during operation of the ventilator said impeller means being located in said passage means and said passage means having an exit portion presenting a mouth through which extracted air is impelled by said impeller means, said exit portion being smoothly divergent and having an outer bounding wall which changes direction between the inlet to the exit portion and the mouth, generally through a full right angle, said mouth being confronted in spaced relation by a weather hood covering over and weathering the mouth, the weather hood presenting a substantially flat baffle surface which extends normal to the airstream thereby detaching air from the outer bounding wall of the exit portion of said passage means and being discharged through said mouth by the impeller means, said exit portion being so shaped and disposed in relation to said flat baffle surface that in operation of the ventilator a sheath of air adjacent the outer bounding wall of the exit portion clings to and flows smoothly along said wall so as to turn through substantially a full right angle without any great loss of energy whilst the body of air which detaches itself from the outer bounding wall of the exit portion impinges on the baffle and flows radially outward along the baffle surface in all directions, discharge passage bounding means forming a smooth continuation of the outer bounding wall of the exit portion, said discharge passage bounding means confronting an inner surface portion of the weather hood and defining therewith a smooth walled discharge passage for the extracted air which discharge passage is of significant extent and which extends generally radially outwardly of said mouth, the discharge passage having an inlet in communication solely with said passage means, through said mouth, and an outlet for the discharge of the extracted air to the outside atmosphere, the discharge passage confining the extracted air between its inlet and its outlet and having a through flow area which progressively increases from its inlet to its outlet.

9. A ventilator as claimed in claim 8 further comprising a flat damper plate automatically movable between a closed position in which it seats on the mouth of said passage means and a fully open position in which it lies flat against the underside of said weather hood from its closed to its open position by the airstream discharging through said mouth.

10. A powered extract ventilator including powered fan impeller means for promoting a flow of air, passage means through which extracted air is caused to flow by said impeller means during operation of the ventilator, said impeller means being located in said passage means and said passage means having a mouth through which the extracted air is impelled by said impeller means for discharge to the outside atmosphere, a weather hood covering over and weathering the mouth of said passage means, a damper comprising a plate and means for guiding the damper plate for substantially parallel movement between a closed position in which it seats on the mouth of said passage means and an open position in which it is held displaced away from said mouth by the discharge of extracted air therethrough, said plate being flat so as not to penetrate into said passage means when in its closed position; and means wherein the damper plate is hinged along one edge to link means in turn hinged to fixed structure of the ventilator on a hinge axis parallel to the plate-link hinge axis, the link means extending away from said one edge of the plate; and strut means wherein at least one strut is provided hingeably connected at one end with the plate towards its edge remote from said one edge thereof and at its other end with fixed structure of the ventilator, the strut extending at an acute angle to the plate in a plane normal to said hinge axis when the plate is in its closed position, the link means and the strut being dimensioned and arranged to guide the plate between its open and its closed positions whilst maintaining the plate balanced on an airstream discharging through the mouth of said passage means substantially normal to the airstream, and to lock the plate in its closed position by toggle action between the plate and the link means when the ventilator is not operating.

11. A powered ventilator including powered fan impeller means for promoting a flow of air, passage means through which extracted air is caused to flow by said impeller means during operation of the ventilator, said impeller means being located in said passage means and said passage means having a mouth through which the extracted air is impelled by said impeller means for discharge to the outside atmosphere, a weather hood covering over and weathering the mouth of said passage means, a damper comprising a plate and means for guiding the damper plate for substantially parallel movement between a closed position in which it seats on the mouth of said passage means and an open position in which it is held displaced away from said mouth by the discharge of extracted air therethrough, said plate being flat so as not to penetrate into said passage means when in its closed position; and means wherein said damper plate is guided on an inclined guide rod whereby the plate or disc may slide down the rod to its closed position under the action of its own weight when the ventilator is shut down and slide up the rod to an open position under the influence of the airstream discharging through the mouth of said passage means when the ventilator is operated.

References Cited

UNITED STATES PATENTS

| | | | |
|---|---|---|---|
| 1,117,287 | 11/1914 | Warden | 98—43 |
| 2,526,290 | 10/1950 | Solzman | 98—43 |
| 2,638,835 | 5/1953 | Strawsine | 98—43 |
| 2,665,625 | 1/1954 | Woodhams | 98—43 X |
| 3,012,495 | 12/1961 | Miller | 98—116 |

FOREIGN PATENTS 125,544   10/1947   Australia.

ROBERT A. O'LEARY, *Primary Examiner.*

W. E. WAYNER, *Assistant Examiner.*